Dec. 19, 1961 C. VAN DER LELY ET AL 3,013,375
DEVICE FOR THE LATERAL DISPLACEMENT OF MATERIAL
LYING ON THE GROUND
Filed Nov. 9, 1959 4 Sheets-Sheet 1
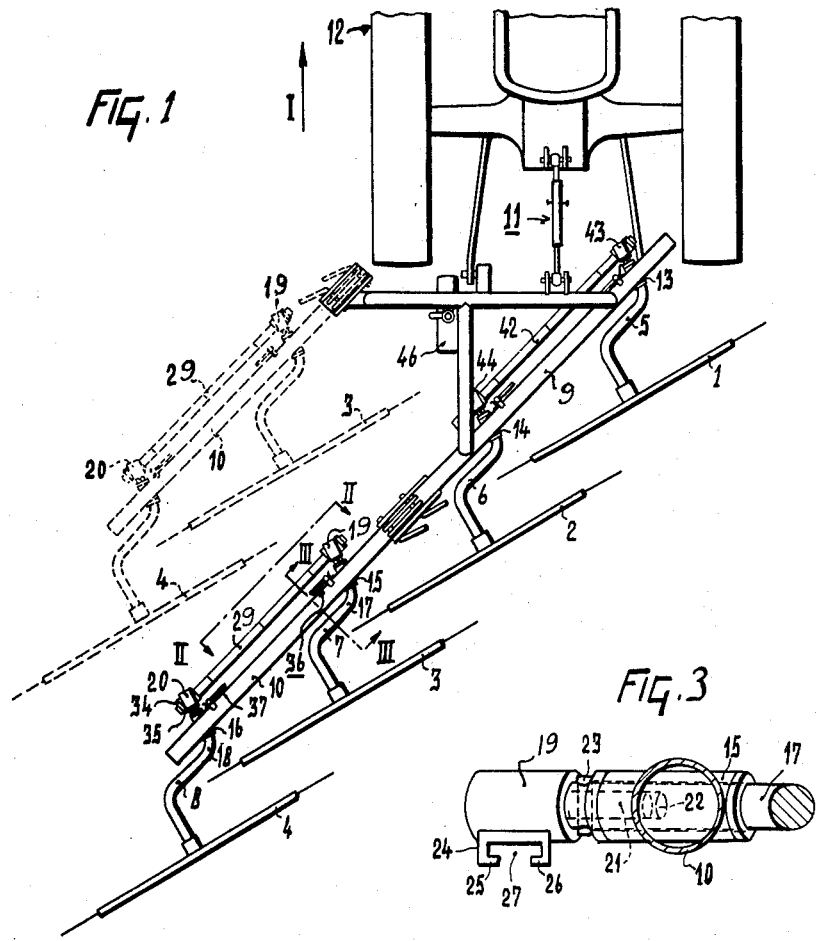
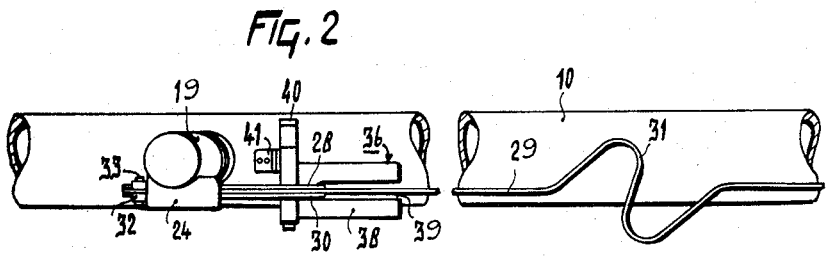
INVENTORS
Cornelis & Ary van der Lely
BY
Mason, Mason & Albright

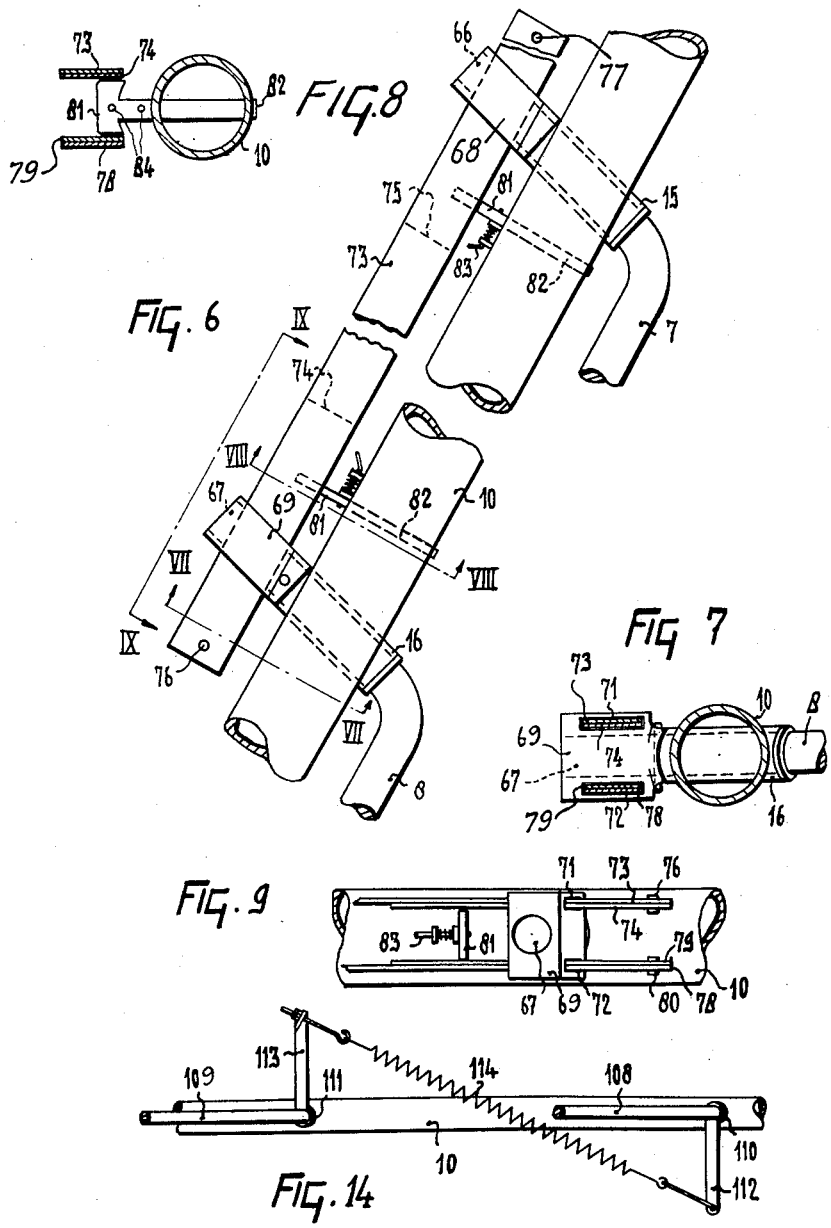

Dec. 19, 1961  C. VAN DER LELY ET AL  3,013,375
DEVICE FOR THE LATERAL DISPLACEMENT OF MATERIAL
LYING ON THE GROUND
Filed Nov. 9, 1959  4 Sheets-Sheet 4
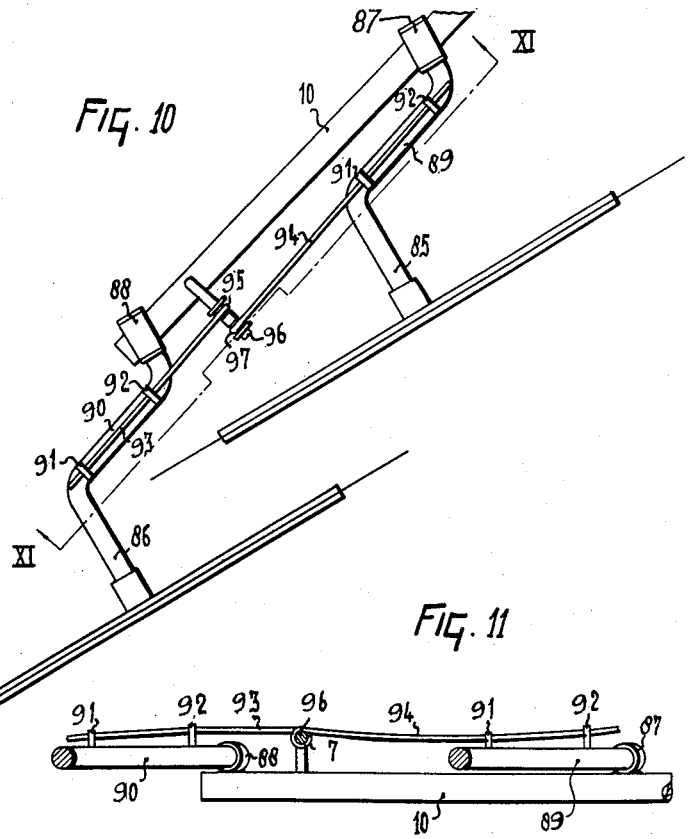
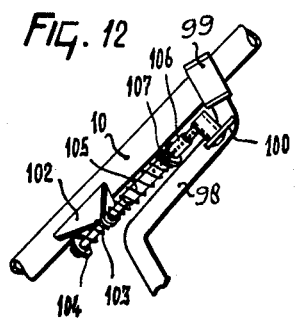
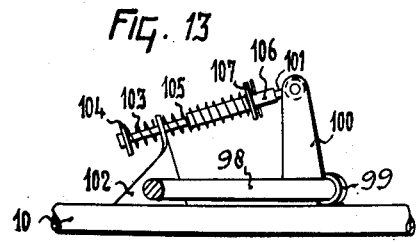
INVENTORS
Cornelis & Ary van der Lely
BY
Mason, Mason & Albright

United States Patent Office 3,013,375
Patented Dec. 19, 1961

3,013,375
DEVICE FOR THE LATERAL DISPLACEMENT OF MATERIAL LYING ON THE GROUND
Cornelis van der Lely, Zug, Switzerland, and Ary van der Lely, Maasland, Netherlands, assignors to C. van der Lely N.V., Maasland, Netherlands, a limited company of the Netherlands
Filed Nov. 9, 1959, Ser. No. 851,598
Claims priority, application Netherlands Nov. 22, 1958
53 Claims. (Cl. 56—377)

The invention relates to a device for the lateral displacement of material lying on the ground, comprising a frame and at least one rake wheel, which is mounted on a support, which is secured to the frame so as to be movable in a vertical direction. In the known devices of this kind draw springs are usually arranged between the frame and the support in order to reduce the pressure of the rake wheels on the ground. This resilient suspension of the rake wheels usually yields satisfactory results, but it may have the disadvantage that the construction is fairly complicated.

The invention has for its object to provide a different, simple resilient arrangement of the rake wheel supports.

In accordance with the invention the support cooperates with only one resilient element, which tends to urge the rake wheel into a position in which it can move upwards and downwards against the resiliency of the element.

Thus the device can be employed advantageously on rather uneven fields. This structure may, moreover, be advantageous, when the device is to be changed over to a different working position. It is thus possible to obtain, in addition, a more compact, structurally attractive device. The structure may, if desired, be located at the same level as the main frame beams.

According to a further aspect of the invention the spring structure of the supports of a device for the lateral displacement of material lying on the ground by means of rake wheels, arranged on supports so as to be vertically movable with respect to the frame, can be simplified and improved by providing means which opposes the pressure of two rake wheels, due to their engagement with the ground while the device is moving thereover. Each wheel is arranged on an individual support, by means of a common, resilient element, which is coupled with each of the supports.

A simple blocking of the vertical movement of the support can be obtained, in accordance with the invention, by causing a blocking device to co-operate with a resilient element, so that a resilient stretch of this element is counteracted.

The invention will be described more fully with reference to a few advantageous embodiments.

FIG. 1 is a plan view of one form of the device according to the invention and

FIG. 2 is a fragmentary side view, on an enlarged scale, taken on the line II—II of FIG. 1.

FIG. 3 is an enlarged sectional view taken on the line III—III of FIG. 1.

FIG. 6 is a fragmentary plan view of a third embodiment and

FIG. 7 is a sectional view taken on the line VII—VII of FIG. 6.

FIG. 8 is a sectional view taken on the line VIII—VIII of the same figure.

FIG. 9 is a side view taken on the line IX—IX of the embodiment shown in FIG. 6.

FIG. 10 is a plan view of a fourth embodiment and

FIG. 11 is a sectional view taken along line 11—11 of FIGURE 10.

FIG. 12 shows a fifth embodiment.

FIG. 13 is a side view of the device shown in FIG. 12.

FIG. 14 is a side view of a sixth embodiment.

Figure 4:
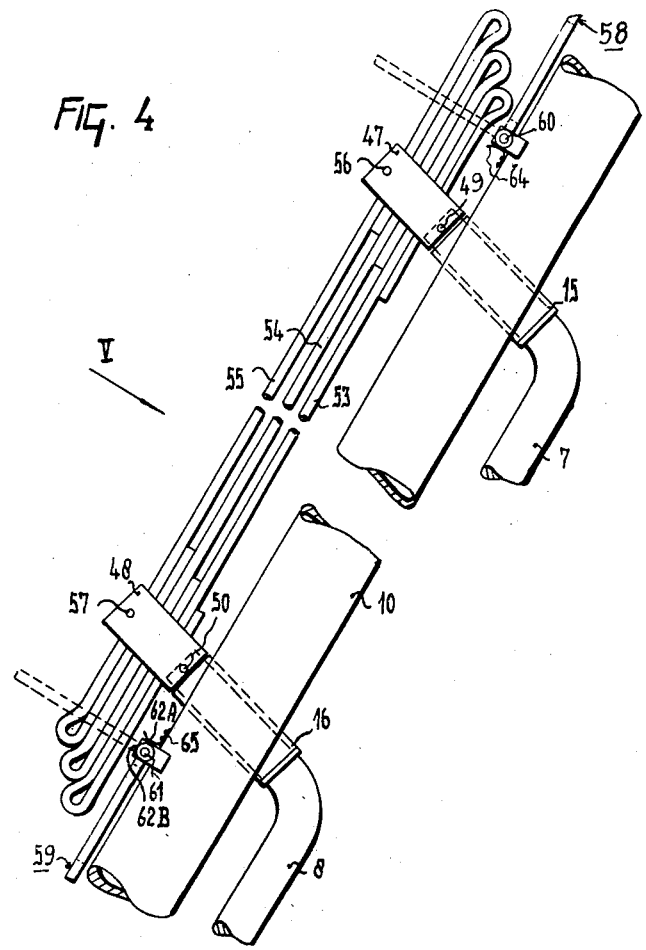
FIG. 4 is a fragmentary plan view of a second embodiment.

Referring first to the embodiment shown in FIGURES 1 to 3 the device has four rake wheels 1, 2, 3 and 4. These rake wheels are arranged, by means of supports 5, 6, 7 and 8, on frame beams 9 and 10. The frame beam 10, together with the supports 7 and 8 and the rake wheels 3 and 4, constitutes a frame portion, which can be displaced, with respect to the frame portion to which the frame beam 9 is secured, into a position as shown in broken lines. The frame portion, to which the frame beam 9 is secured, is coupled with the lifting device 11 of a tractor 12, in order to move the device in the direction I. The supports 5 and 6, shaped in the form of cranks, are journalled in bearings 13 and 14, which extend through the frame beam 9; the cranks 7 and 8 are journalled correspondingly in bearings 15 and 16, which extend through the frame beam 10 (see FIG. 3). Each of the cranks 7 and 8 are provided with crank shafts 17 and 18, respectively. As seen in FIGURE 3, each crank shaft 17 or 18 is provided with a recess or opening 22 for the reception of a reduced portion 21 of a shaft 19 or 20, as seen in FIGURES 1–3. A key or pin 23, as shown in FIGURE 3, extends transversely through an aperture adjacent the end of the crank shaft 17 (or 18), and through an aperture in the reduced portion 21 of the other shaft 19 (or 20). As shown in FIGURES 2 and 3, there is provided a housing or guide 24 which is affixed to the underside of the shaft 19 (or 20). This housing has two hook-like parts 25 and 26 that form a slot-like opening 27 with an open bottom portion as seen in FIGURE 3. In this housing 27 are arranged strips 28, 29 and 30, of which the strips 28 and 30 are shorter than the strip 29. The strip 29 extends beyond the shaft 20, which is provided similarly to the shaft 19 with a guide, in which the strip 29 with two short strips are arranged. The strip 29 is provided, between the shaft 19 and the shaft 20, with a curved part 31. On that side of the shaft 19, which is remote from the shaft 20, the strips 28, 29 and 30 are connected with each other by means of plates 32 and bolts 33 (FIG. 2). In the same manner the strip 29 is connected with the two further strips near the shaft 20 by means of plates 34 and bolts 35. The plates 32 and 34 are arranged so that the strip 29 with the strips lying above and below it, near the shafts 19 and 20, cannot shift in the holes 27 of the housings 25 in the position in which the strips are substantially horizontal.

The strip 29 with the strips 28 and 30 and the further short strips near the shaft 20 constitute a resilient element, which resists the pressure with which the rake wheels 3 and 4 bear on the ground.

In the position shown in FIG. 2, in which the strips are horizontal, the rake wheels 3 and 4 occupy the central position. If during travel the rake wheels 3 and 4 tend to move out of their central positions, the shafts 19 and 20 will turn about the centre lines of the crank shafts 17 and 18. The strip 29 with the strips 28 and 30 must follow this turn, so that the strips get out of their horizontal positions. Since the other end of the strip 29 is, however, secured to the device, i.e. to the crank 8, a bending movement is exerted on the strip 29. Since the plates 32 and 34 prevent the strip 29 from shifting, the curved portion 31, i.e. one or more undulations, will be subjected to tensile forces. Since the strips 28 and 30 extend over a certain length along the strip 29, these strips will be bent with the strip 29. The strip 29 with the strips 28 and 30 thus constitute a resilient element for the cranks 3 and 4, the strips operating as blade springs, which tend to hold the rake wheels in their central positions. Although in this embodiment the strips 28 and 30 are separate strips, a part with a larger section may, as an alternative, be formed by a curved portion of the end of the strip 29. The openings 27, in which the strips are housed, have a width which is preferably as large as half the diameter of the crank shafts 17 and 18.

On the frame portion formed by the frame beam 10 is in that way provided only one resilient element for the rake wheels secured to this frame beam.

When the frame beam 10 is displaced into the position shown in broken lines, no special measures need be taken to hold the rake wheels also resiliently in their central positions.

In order to prevent a turn of the cranks 7 and 8 in the bearings 15 and 16, provision is made of two blocking members 36 and 37 of identical shape, of which the blocking member 36 is shown in detail in FIG. 2. This blocking member comprises a plate 38, in which a slot 39 is provided. The plate 38 is adapted to turn about a pivotal shaft 40, by which the blocking member is secured to the frame beam 10. The plate 38 occupies a position in which the cranks are not locked against rotation so as to extend along the frame beam 10. The plate 38 can be positioned by turning about the shaft 40 so that the strips 28, 29 and 30 arrive in the slot 39. Thus the strip 29 can substantially no longer be bent, so that a turn of the crank 7 is practically prevented. In order to hold the plate 38 in the position in which it extends along the frame beam 10 and in the position at right angles to the frame beam, in which the slots 39 surrounds the blade springs, provision is made of a spring 41, which holds the plate in each of the positions, since it bears on a flat part of the plate 38. Since in one position the spring 41 co-operates with a different flat part of the plate 38 than in the other position, the plate can occupy a central position in which the spring coincides with the line of intersection of the flat parts.

The cranks 5 and 6 are counteracted in the same manner as the cranks 7 and 8, in their rotation in the bearings 13 and 15, by means of a resilient element 42, shaped in the form of a blade spring and arranged parallel to the frame beam 9 between prolongations 43 and 44 of the cranks 5 and 6. The resilient elements thus formed for the cranks are connected only with two supports and not with the frame of the device.

In order to adjust the pressure of the rake wheels on the ground, the ground wheel 46, which supports the device, can be adjusted in the direction of height with respect to the frame. If no ground wheel is provided and the device is supported completely by the lifting device 11 of a tractor, the pressure of the rake wheels can be adjusted by adjusting the lifting device.

Figure 5:
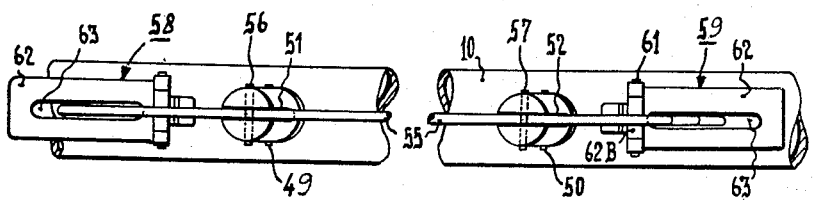
FIG. 5 is a side view thereof, viewed in the direction of the arrow V of FIG. 4.

In the embodiment shown in FIGURES 4 and 5 the cranks 7 and 8 are connected with each other by resilient elements, which tend also to hold the rake wheels 3 and 4 in their central postions, but which has another shape as the resilient elements shown in FIGURES 1 to 3. In this embodiment the prologations of the crank shafts of the cranks 7 and 8 are provided with shafts 47 and 48, which are secured thereto by means of locking pins 49 and 50. The shafts 47 and 48 are provided with slots 51 and 52, through which extend rods 53, 54 and 55. These rods, which are located side by side, are bent over at their ends so that the parts located in the slots 51 and 52 have twice the total width of the three rods separately. The rods 53, 54 and 55, which constitute a resilient element, are capable of shifting, during operation, in the slots 51 and 52 in a direction of length, but they are prevented from shifting in a transverse direction by pins 56 and 57.

When the cranks 7 and 8 are turned, these rod-shaped, resilient elements are exposed to bending forces, so that they tend to hold the cranks 7 and 8 in their central positions.

In order to block the cranks 7 and 8 against rotation, blocking members 58 and 59 are provided, which have pivotal shafts 60 and 61, provided on the frame beam 10. These blocking members are located on the outer sides of the shafts 47 and 48 and consist of strips 62, which have slots 63. The blocking members will be turned so that the ends of the rod-shaped elements projecting beyond the shafts 48 and 49 arrive in the slots 63. Thus the rods 53, 54 and 55 can substantially no longer bend over, so that a turn of the cranks 7 and 8 is prevented both in the upward and in the downward direction. In order to hold the blocking members 58 and 59 in the position parallel to the frame beam 10 or in the position at right angles to this frame beam, as is shown in broken lines in FIG. 4, blade springs 64 and 65 are provided, which may be in contact either with a flat part 62A or with a flat part 62B and which tend to move the blocking members to an end position out of a central position. Although in this embodiment the shafts 47 and 48 are arranged separately on the crank shafts, the crank shafts themselves may, as an alternative, be prolonged, whilst these crank shafts may be provided directly with holes for the resilient element.

FIGS. 6 to 9 show a further embodiment in which a resilient deflection of the supports 7 and 8 is rendered possible. In this embodiment the prolongations 66 and 67 of the crank shafts of the cranks 7 and 8 are provided with sleeves 68 and 69. These sleeves, of identical shape, are provided, as is shown for the sleeve 69, on one side of the crank shaft with a hole 71 and on the other side of the crank shaft with a hole 72. Through the holes or apertures 71 of the sleeves 68 and 69 is arranged a long strip 73, forming a blade spring. Below this strip, in the hole 71 of the sleeve 69, is arranged a short strip 74 and in the hole 71 of the sleeve 68 is arranged a short strip 75. The plates 74 and 75 are connected with the strip 73 by means of pins 76 and 77. These pins prevent, in addition, the strip 73 from shifting out of the holes 71. In the lower holes 72 of the sleeves 68 and 69 is arranged a strip 78, above which shorter strips 79 are arranged in the holes. The strips 79 are connected with the strip 78 by means of pins 80 (see FIG. 9), which prevent the strip 78 with the strips 79 from slipping out of the holes 72.

The strips 73 and 78 constitute resilient elements, which counteract a turn of the cranks 7 and 8, both in upward and in downward direction. When the cranks turn, these strips are bent, so that they tend to hold the cranks 7 and 8 in their central positions.

The cranks 7 and 8 can be prevented from turning by means of blocking members consisting of displaceable parts 81 with holes 84, which are arranged between two superimposed resilient elements. The members 81 as is shown in FIG. 8, are connected with shafts 82, which are journalled in the frame beam 10. On the frame beam 10 are furthermore provided locking pins 83, which can be inserted into one of the holes 84 in the displaceable members 81. Thus the members 81 can be held in a position, in which they do not lie between the springs 73 and 78, and in a position, in which these pins are located between these resilient elements, as is shown in FIG. 8. When the pins 81 are located between the resilient elements 73 and 78, it is practically no longer possible to bend them so that a turn of the cranks 7 and 8 in their bearings 15 and 16 is avoided.

Although in the foregoing embodiments always two supports are connected with the same resilient element, a separate resilient element may, as an alternative, be provided for each support. The resilient elements are located, in the foregoing embodiments, always on the side of the frame beam where the rake wheels are not arranged. Thus the crank shafts are prevented from slipping out of their bearings at least in one direction by the presence of the resilient elements. As an alternative, the resilient elements may be provided on the same side of the frame beam as the rake wheels.

In the embodiment shown in FIGS. 10 and 11 the rake wheels 3 and 4 are arranged on cranks 85 and 86, which are journalled in bearings 87 and 88, secured to the top side of the frame beam 10. The crank arms 89 and 90 of the cranks 85 and 86 are both provided with two upright extensions 91 and 92 of different length, which are provided with holes through which rods can be taken and which are located at different distances from the crank arms.

Through the holes of the strips 91 and 92, of the crank 86, for example, is taken a rod 93 and through the holes of the strips 91 and 92 of the crank 85 is taken a rod 94. The rod 93, which extends in the same direction as the crank arm 90, is provided with a curved end 95, which constitutes an eyelet which surrounds a shaft 96, secured to the frame beam 10. This shaft is located on the side of the bearing 88 opposite the crank arm 90. The rod 93 is adapted to pivot about the shaft 96 and is displaceable in the holes of the strips 91 and 92. Both when the crank 86 turns upwards and downwards in the bearing 88, the rod 93 is subjected to bending stress, so that this rod tends to hold the crank 86 in the central position. The rod 94 is provided with an eyelet 97, which surrounds the same shaft 96 and is adapted to pivot about this shaft. The rod 94 is furthermore displaceable in the holes of the strips 91 and 92 on the crank arm 89, to which it extends substantially parallel. The rod 94 is located on the same side of the bearing 87 as the crank arm 89, since it is coupled with the same shaft 96 as the rod-shaped, resilient element 93. When the crank 85 turns in the bearing 87, the rod 94 is also exposed to bending stress, so that this rod tends to hold the crank 85 in its central position and the crank 85 will deflect resiliently, when turning in the bearing 87. The lengths of the rods 93 and 94 are not equal, since the shaft 96 is located nearer the bearing 88 than the bearing 87. Although in the first embodiments the resilient elements are always connected with two supports and not with the frame, the resilient element of the last-mentioned embodiment is connected at one end with a support and at the other end with the frame. The resilient elements of the foregoing embodiments are always substantially at the same level as the crank taps.

The fastening of the resilient elements as described above does not require the use of chains or wires for mounting and, when the cranks are displaced, the resilient elements can be displaced with them in a simple manner.

In the structure shown in FIGS. 12 and 13 a different resilient element is provided, which counteracts a deflection of the support of a rake wheel. In this embodiment a frame beam 10 is provided with a crank 98, which is journalled in a bearing 99, arranged on the frame beam 10. Near the crank shaft of the crank 98 provision is made of an upright strip 100, which is provided with a shaft 101, which is adapted to pivot with respect to the strip 100. The shaft 101 is taken through a hole in the strip 102, which is secured to the frame beam 10. On one side of the strip 102 is provided a coiled compression spring 103 around the shaft 101 between the plate 104 attached to the shaft 101 and the strip 102. On the other side of the strip 102, in line with the spring 103, is provided a coiled compression spring 105 surrounding the shaft 101 and an elongated sleeve 106, which surrounds the shaft 101 and is adapted to shift over the shaft 101. The sleeve 106 is provided with a plate 107 and the spring 105 is situated between the strip 102 and the plate 107.

When the crank 98 moves downwards, the coiled compression spring 105 will contact the strip 102, which constitutes a stop, so that the downward movement of the crank 98 is counteracted. When the crank 98 moves upwards, the spring 103 will abut against the stop 102, so that also this movement is counteracted. The springs 103 and 105 will thus tend to hold the crank 98 in its central position.

By displacing the sleeve 106 the tension of the springs 103 and 105 can be controlled, so that the pressure of the rake wheels on the ground can be varied.

FIG. 14 shows the sixth embodiment in which two cranks 108 and 109 on which rake wheels can be arranged are connected by a common resilient element, which acts upon the pressure of the rake wheels. The cranks 108 and 109 are journalled in bearings 110 and 111, which are provided on a frame beam 10. The crank 108 is provided with a strip 112, which is orientated downwards, whereas the crank 109 is provided with a strip 113, pointing upwards. At the free ends of the strips 112 and 113 provision is made for a tensile spring 114.

The weight of the rake wheels bearing on the cranks 108 and 109 will tend to turn the cranks in the bearings 110 and 111, the cranks thus moving downwards. Thus the spring 114 will be stretched, so that it will counteract the downward movement of the cranks 108 and 109 and the pressure of the rake wheels on the ground will thus be reduced by the spring 114.

What we claim is:

1. A device for laterally displacing material lying on the ground, comprising a mobile frame, support means vertically movable on said frame, a rake wheel mounted on said support means and resilient means operatively and opposingly engaging said support means and applying vertical pressure thereto to hold said wheel in a desired position.

2. A device as claimed in claim 1 in which said support means comprises a crank.

3. A device as claimed in claim 1 in which said support means comprises a crank with means pivotally mounting said crank to said frame, and means adjacent the other end of said crank for rotatably mounting said rake wheel.

4. A device as claimed in claim 1 in which said support means comprisse a crank with means pivotally mounting said crank to said frame on one side of said support means, and means adjacent the other end of said crank for rotatably mounting said rake wheel.

5. A device as claimed in claim 4 wherein means is provided for mounting said resilient means on one side of said frame and mounting said rake wheel on the opposite side of said frame.

6. A device as claimed in claim 1 in which said resilient means comprises a spring.

7. A device as claimed in claim 2 in which said resilient means comprises a spring.

8. A device as claimed in claim 3 in which said resilient means comprisse a spring.

9. A device as claimed in claim 4 in which said resilient means comprises a spring.

10. A device as claimed in claim 5 in which said resilient means comprises a spring.

11. A device as claimed in claim 1 in which said resilient means includes a spring having at least one undulated portion between its ends whereby to permit said spring to undulate under stress, and means mounting said spring on said support means.

12. A device as claimed in claim 2 in which said resilient means includes a spring having at least one undulated portion between its ends whereby to permit said spring to undulate under stress, and means mounting said spring on said support means.

13. A device as claimed in claim 3 in which said resilient means includes a spring having at least one undulated portion between its ends wherby to permit said spring to undulate under stress, and means mounting said spring on said support means.

14. A device as claimed in claim 4 in which said resilient means includes a spring having at least one undulated portion between its ends whereby to permit said spring to undulate under stress, and means mounting said spring on said support means.

15. A device as claimed in claim 5 in which said resilient means includes a spring having at least one undulated portion between its ends whereby to permit said spring to undulate under stress, and means mounting said spring on said support means.

16. The structure of claim 15 in which said last mentioned means includes a housing mounted on said support means, and means for attaching the end of said resilient means to said support means.

17. A device as claimed in claim 16 in which means is provided for locking said support means.

18. A device as claimed in claim 17 in which the last named means comprises a plate having a slot, a pivoted shaft mounting said plate on said frame whereby said plate may be turned about its pivot to lock or release said support means and thereby prevent or allow vertical movement thereof.

19. A device as claimed in claim 1 in which said resilient means comprises a spring in the form of a strip, and additional strips of shorter length mounted on the opposite sides of said strip.

20. A device as claimed in claim 2 in which said resilient means comprises a spring in the form of a strip, and additional strips of shorter length mounted on the opposite sides of said strip.

21. A device as claimed in claim 1 in which said support means includes a plurality of cranks each crank mounting a rake wheel, said resilient means including means for connecting a pair of cranks to each other.

22. A device as claimed in claim 2 in which said support means includes a plurality of cranks each crank mounting a rake wheel, said resilient means including means for connecting a pair of cranks to each other.

23. A device as claimed in claim 3 in which said support means includes a plurality of cranks each crank mounting a rake wheel, said resilient means including means for connecting a pair of cranks to each other.

24. A device as claimed in claim 4 in which said support means includes a plurality of cranks each crank mounting a rake wheel, said resilient means including means for connecting a pair of cranks to each other.

25. A device as claimed in claim 5 in which said support means includes a plurality of cranks each crank mounting a rake wheel, said resilient means including means for connecting a pair of cranks to each other.

26. A device as claimed in claim 21 wherein said resilient means further comprises a plurality of rod means having portions located side by side.

27. A device as claimed in claim 22 wherein said resilient means further comprises a plurality of rod means having portions located side by side.

28. A device as claimed in claim 23 wherein said resilient means further comprises a plurality of rod means having portions located side by side.

29. A device as claimed in claim 24 wherein said resilient means further comprises a plurality of rod means having portions located side by side.

30. A device as claimed in claim 25 wherein said resilient means further comprises a plurality of rod means having portions located side by side.

31. A device as claimed in claim 26 in which said rod means additionally include looped connecting ends.

32. A device as claimed in claim 27 in which said rod means additionally include looped connecting ends.

33. A device as claimed in claim 28 in which said rod means additionally include looped connecting ends.

34. A device as claimed in claim 29 in which said rod means additionally include looped connecting ends.

35. A device as claimed in claim 30 in which said rod means additionally include looped connecting ends.

36. A device as claimed in claim 26 including locking means for preventing vertical movements of said support means on said frame.

37. A device as claimed in claim 27 including locking means for preventing vertical movements of said support means on said frame.

38. A device as claimed in claim 28 including locking means for preventing vertical movements of said support means on said frame.

39. A device as claimed in claim 29 including locking means for preventing vertical movements of said support means on said frame.

40. A device as claimed in claim 30 including locking means for preventing vertical movements of said support means on said frame.

41. A device as claimed in claim 1 in which said support means includes a pair of cranks having ends, and said resilient means includes at least one flat spring having ends with means for mounting said spring adjacent each end on one end of each of said pair of cranks, and a rake wheel mounted on the opposite end of each crank.

42. A device as claimed in claim 41 in which locking means is provided for preventing rotation of said cranks relative to said frame.

43. A device as claimed in claim 42 in which resilient means is located on one side of said frame and said rake wheels are located on the opposite side of said frame.

44. A device as claimed in claim 1 in which said rake wheel and said resilient means are mounted on the same side of said frame.

45. A device as claimed in claim 2 in which said rake wheel and said resilient means are mounted on the same side of said frame.

46. A device as claimed in claim 3 in which said rake wheel and said resilient means are mounted on the same side of said frame.

47. A device as claimed in claim 4 in which said rake wheel and said resilient means are mounted on the same side of said frame.

48. A device as claimed in claim 5 in which said rake wheel and said resilient means are mounted on the same side of said frame.

49. A device for laterally displacing material lying on the ground, comprising a mobile frame, support means vertically movable on said frame, a rake wheel mounted on said support means and a single resilient means operatively and opposingly engaging said support means and applying vertical pressure thereto to hold said wheel in a desired position.

50. A device for laterally displacing material lying on the ground, comprising a frame, support means vertically movable on said frame, a rake wheel mounted on said support means and resilient rod means operatively and opposingly engaging said support means and applying vertical pressure thereto to hold said wheel in a desired position.

51. A device for laterally displacing material lying on the ground, comprising a frame, support means vertically movable on said frame, a rake wheel mounted on said support means and striplike resilient means operatively and opposingly engaging said support means and applying vertical pressure thereto to hold said wheel in a desired position.

52. A device for laterally displacing material lying on the ground, comprising a frame, a crank vertically movable on said frame, a rake wheel mounted on said crank and resilient rod means engaging said crank, said means being arranged so as to extend partly along the crank arm.

53. A device for laterally displacing material lying on the ground, comprising a frame, a crank vertically movable on said frame, a rake wheel mounted on said crank and striplike resilient means engaging said crank, said means being arranged so as to extend partly along the crank arm.

References Cited in the file of this patent
UNITED STATES PATENTS

| | | |
|---|---|---|
| 2,447,354 | Morrill | Aug. 17, 1948 |
| 2,680,343 | Enos | June 8, 1954 |
| 2,807,927 | van der Lely | Oct. 1, 1957 |
| 2,816,414 | van der Lely et al. | Dec. 17, 1957 |